US010595096B2

(12) United States Patent
McCoy et al.

(10) Patent No.: US 10,595,096 B2
(45) Date of Patent: *Mar. 17, 2020

(54) METHOD AND APPARATUS FOR REDIRECTING AN IPTV DEVICE

(71) Applicant: Sony Interactive Entertainment LLC, San Mateo, CA (US)

(72) Inventors: Charles McCoy, Coronado, CA (US); Ling Jun Wong, Republic of Singapore (SG); True Xiong, San Diego, CA (US); Leo Pedlow, Ramona, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,700

(22) Filed: Dec. 14, 2015

(65) Prior Publication Data
US 2016/0156990 A1 Jun. 2, 2016

Related U.S. Application Data

(63) Continuation of application No. 13/326,978, filed on Dec. 15, 2011, now Pat. No. 9,215,481.
(Continued)

(51) Int. Cl.
*H04N 21/61* (2011.01)
*H04N 21/41* (2011.01)
(Continued)

(52) U.S. Cl.
CPC ..... *H04N 21/6125* (2013.01); *H04N 21/2387* (2013.01); *H04N 21/4122* (2013.01);
(Continued)

(58) Field of Classification Search
CPC .......... H04N 21/6125; H04N 21/6543; H04N 21/4122; H04N 21/2387; H04N 21/4126; H04N 21/44227; H04N 21/8586
See application file for complete search history.

(56) References Cited

U.S. PATENT DOCUMENTS 8,452,878 B2 5/2013 Foti
8,763,061 B2 * 6/2014 Falvo ................. H04N 5/44543
725/110
(Continued)

FOREIGN PATENT DOCUMENTS

CN 101662650 3/2010
CN 101867781 10/2010
CN 101938616 1/2011

OTHER PUBLICATIONS

Office Action issued in corresponding Chinese application No. 201210027306.7 dated Feb. 11, 2014.

*Primary Examiner* — Benjamin R Bruckart
*Assistant Examiner* — Aklil M Tesfaye
(74) *Attorney, Agent, or Firm* — Haug Partners LLP; William S. Frommer

(57) ABSTRACT

A system and method for receiving user authentication information from a secondary device and sending a list of IPTV devices associated with the user authentication information to the secondary device. IPTV device selection is received from the secondary device and device identification information corresponding to a selected IPTV device is sent to the secondary device. A content selection from an asset list is received at a server and post execution instructions for the selected IPTV device are generated. Next asset information is sent to the selected IPTV device. The asset information includes content associated with the content (Continued)

selection and the post execution instructions. The post execution instructions determine further IPTV device functionality.

6 Claims, 12 Drawing Sheets

Related U.S. Application Data

(60) Provisional application No. 61/443,440, filed on Feb. 16, 2011.

(51) Int. Cl.
*H04N 21/442* (2011.01)
*H04N 21/858* (2011.01)
*H04N 21/2387* (2011.01)
*H04N 21/6543* (2011.01)

(52) U.S. Cl.
CPC ... *H04N 21/4126* (2013.01); *H04N 21/44227* (2013.01); *H04N 21/6543* (2013.01); *H04N 21/8586* (2013.01)

(56) References Cited

U.S. PATENT DOCUMENTS

| | | | |
|---|---|---|---|
| 8,938,497 B1* | 1/2015 | Wang | H04N 21/44227 709/204 |
| 2004/0068744 A1* | 4/2004 | Claussen | H04N 5/4401 725/81 |
| 2007/0107019 A1* | 5/2007 | Romano | H04N 5/4401 725/80 |
| 2007/0157281 A1 | 7/2007 | Ellis et al. | |
| 2008/0059998 A1 | 3/2008 | McClenny et al. | |
| 2008/0155062 A1 | 6/2008 | Rabold et al. | |
| 2008/0259906 A1 | 10/2008 | Shkedi | |
| 2009/0125582 A1* | 5/2009 | Marcus | H04N 7/17318 709/203 |
| 2009/0193483 A1 | 7/2009 | Hwang et al. | |
| 2009/0210477 A1 | 8/2009 | White et al. | |
| 2009/0260031 A1* | 10/2009 | Kim | H04N 7/17318 725/39 |
| 2009/0328091 A1 | 12/2009 | Hua et al. | |
| 2010/0005177 A1 | 1/2010 | Cagenius | |
| 2010/0115554 A1* | 5/2010 | Drouet | H04N 5/44543 725/41 |
| 2010/0122281 A1 | 5/2010 | Wang et al. | |
| 2010/0263008 A1* | 10/2010 | Meuninck | H04N 7/17318 725/110 |
| 2011/0029999 A1 | 2/2011 | Foti | |
| 2011/0093898 A1* | 4/2011 | Rosenthol | H04N 21/4314 725/46 |
| 2011/0119721 A1* | 5/2011 | Piepenbrink | H04N 21/4314 725/109 |
| 2011/0135278 A1* | 6/2011 | Klappert | G06F 17/241 386/278 |
| 2011/0145852 A1 | 6/2011 | Lee et al. | |
| 2011/0167444 A1 | 7/2011 | Sun et al. | |
| 2012/0017250 A1 | 1/2012 | Tirasirikul et al. | |
| 2012/0020428 A1 | 1/2012 | Roth et al. | |
| 2012/0162537 A1 | 6/2012 | Maddali et al. | |
| 2012/0198088 A1* | 8/2012 | Yellin | H04N 21/251 709/231 |
| 2012/0240148 A1* | 9/2012 | Liu | H04N 21/25816 725/25 |

* cited by examiner

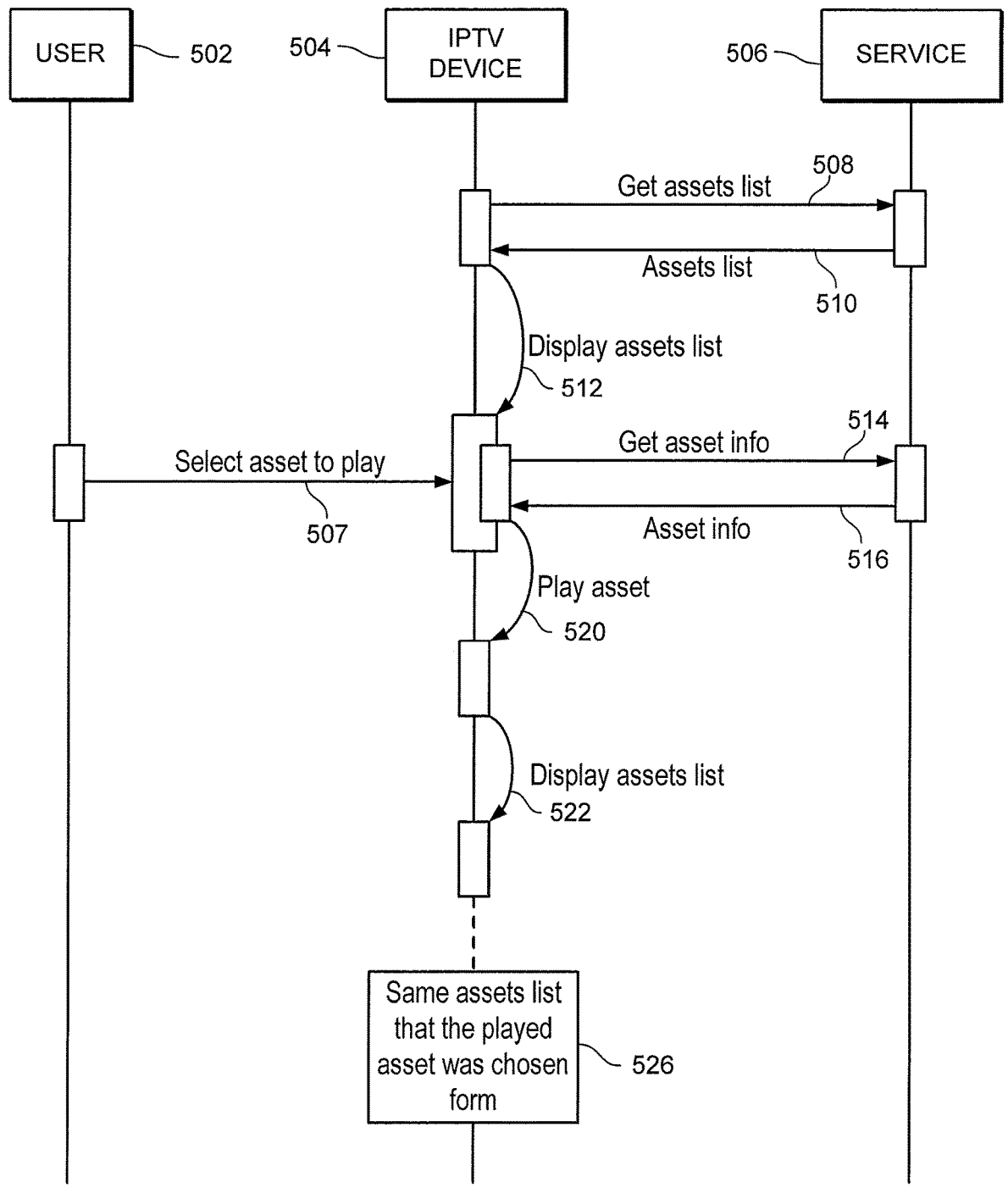
F I G. 5A

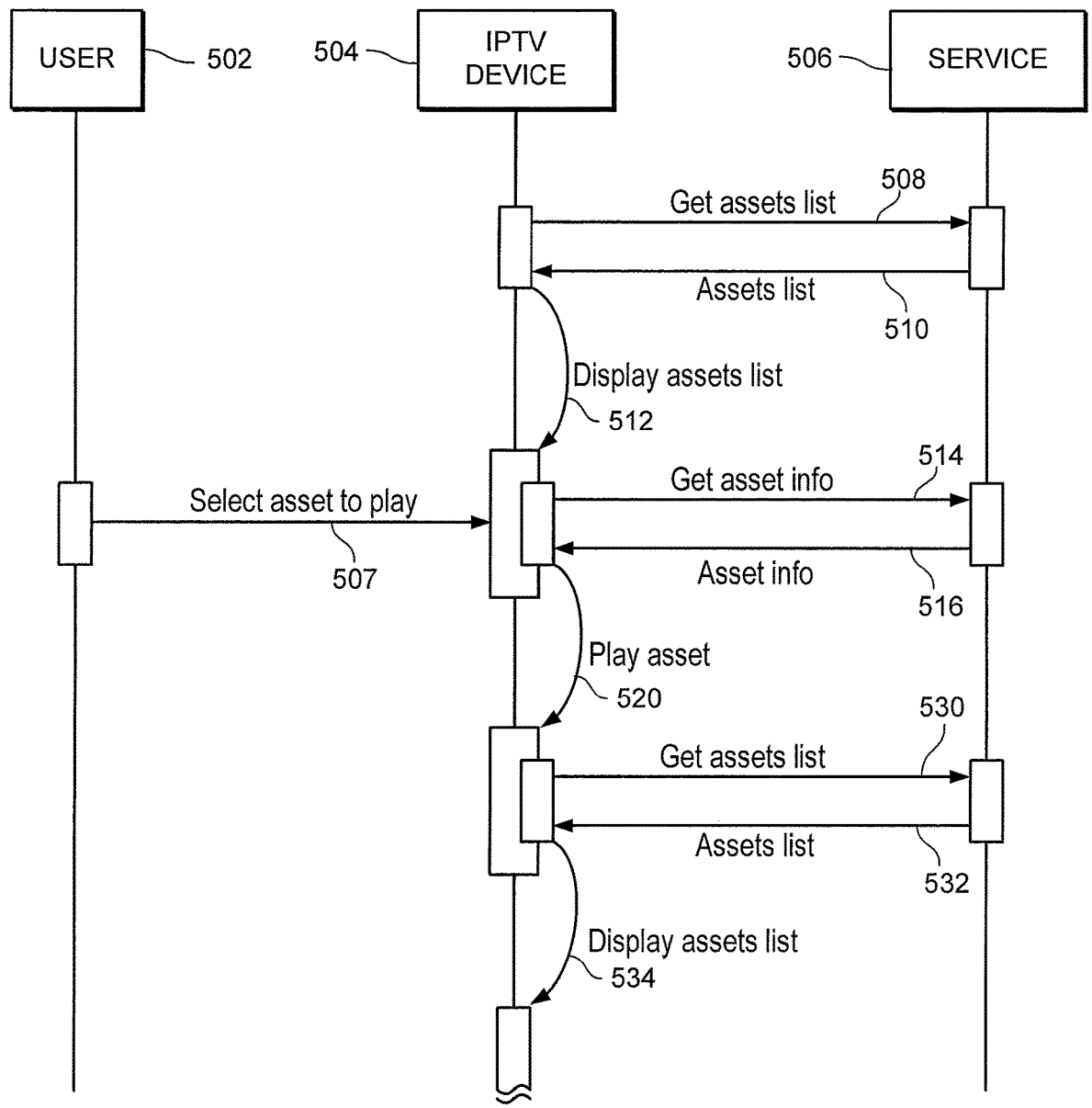
F I G. 5B

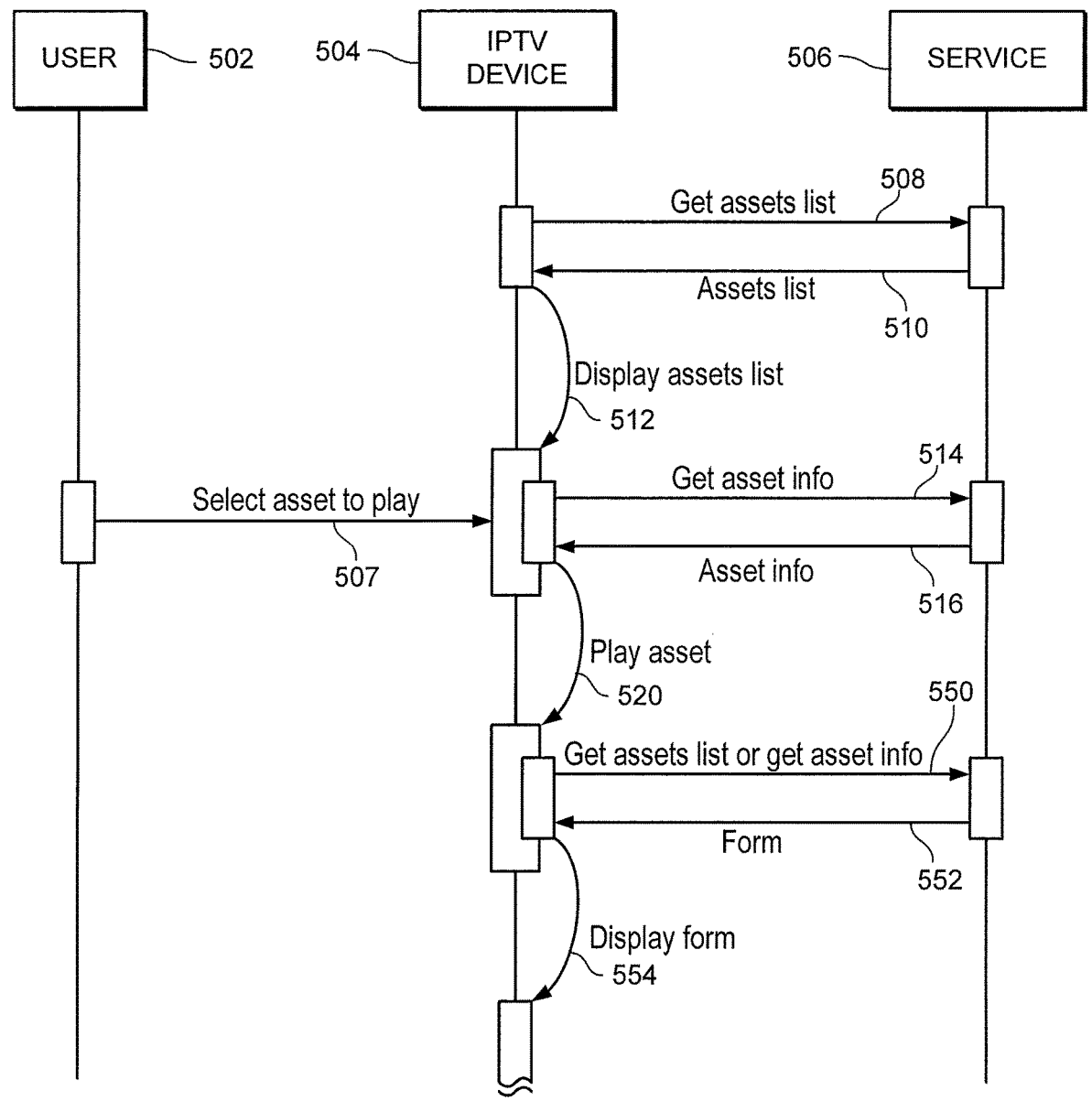
F I G. 5D

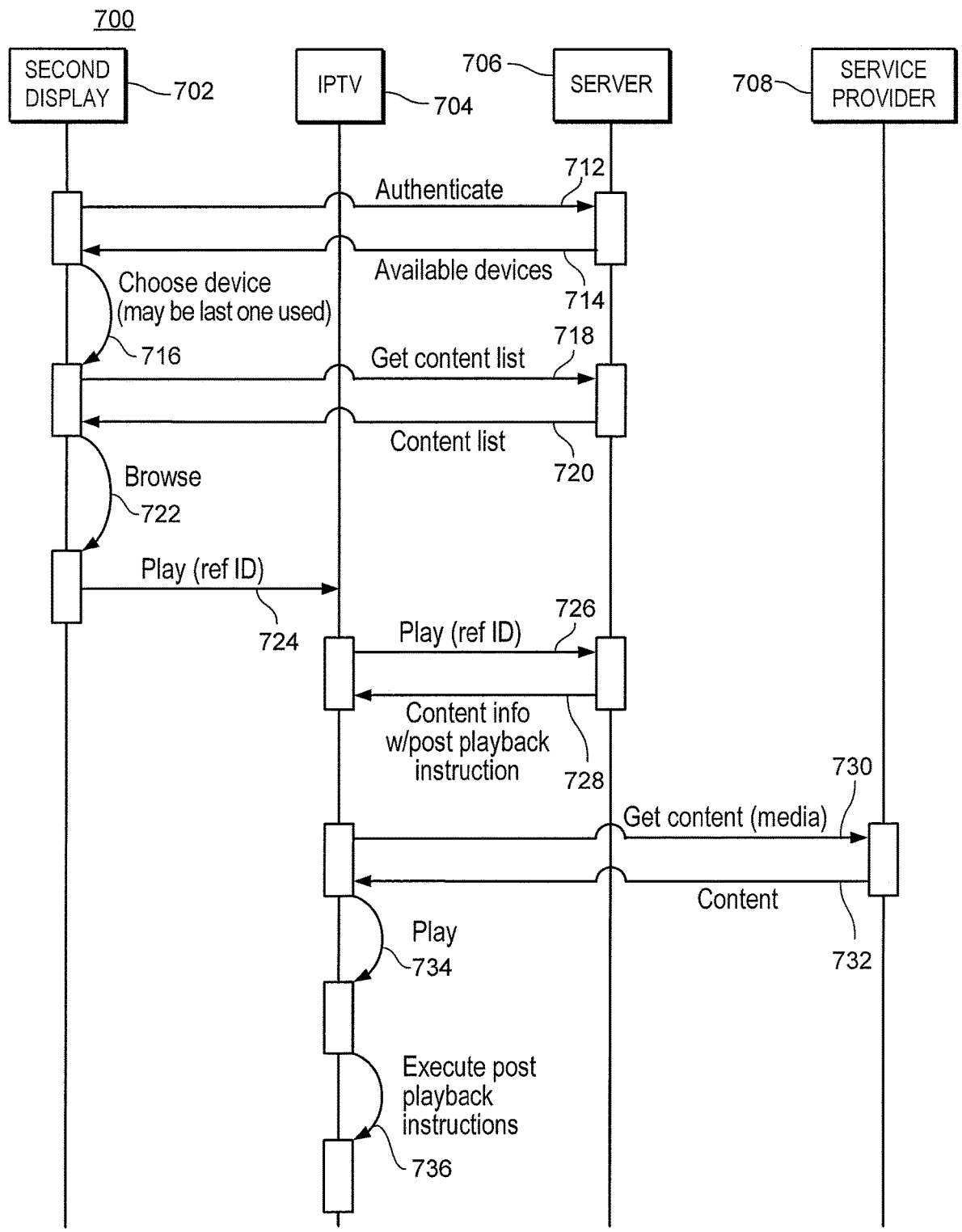
F I G. 7

METHOD AND APPARATUS FOR REDIRECTING AN IPTV DEVICE

CLAIM TO PRIORITY

This is a continuation of application Ser. No. 13/326,978, filed Dec. 15, 2011, which is entitled to the priority filing date of provisional application Ser. No. 61/443,440, filed Feb. 16, 2011, the entirety of which is incorporated herein by reference.

BACKGROUND

1. Field of the Invention

This invention relates generally to a system and method of controlling one device capable of accessing Internet Protocol Television (IPTV) using a second device and more specifically to redirecting an IPTV device after content playback.

2. Background Discussion

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

One embodiment of the present invention is directed to a system and method of redirecting an IPTV device after content playback. The redirect can be specified by a service provider, an advertising server, or a user's input.

Another embodiment of the present invention is directed to using the redirect function to provide promotional material, additional information, recommended content, product offerings, merchandise sales and other material and/or articles available for sale.

Yet another embodiment of the present invention is directed to a non-transitory computer-readable medium storing a computer program that when executed on a computer, such as a server, performs processing. The server program includes receiving user authentication information from a secondary device and sending a list of IPTV devices associated with the user authentication information to the secondary device. IPTV device selection is received from the secondary device and device identification information corresponding to a selected IPTV device is sent to the secondary device. A content selection from an asset list is received at a server and post execution instructions for the selected IPTV device are generated. Next asset information is sent to the selected IPTV device. The asset information includes content associated with the content selection and the post execution instructions. The post execution instructions determine further IPTV device functionality.

Yet another embodiment of the present invention is directed to the server program described above, wherein the post execution instructions instruct the selected IPTV device to: request an asset list from a server; receive the asset list from the server; and display the asset list on the selected IPTV device.

Yet another embodiment of the present invention is directed to the server program described above, wherein the post execution instructions instruct the selected IPTV device to: request asset information; receive the asset information; and display the asset information on the selected IPTV device.

Yet another embodiment of the present invention is directed to the server program described above, wherein the post execution instructions instruct the selected IPTV device to: request an asset list or asset information; and receive a form, that the selected IPTV device displays.

Yet another embodiment of the present invention is directed to a method, implemented using an IPTV device that includes requesting asset information from a service provider and receiving asset information from the service provider. The asset information from the service provider comprises content information and one or more post execution instructions. An instruction to display the content information is executed and then post execution instructions are executed (following execution of the command to display content information).

Yet another embodiment of the present invention is directed to the method implemented using an IPTV device that also includes requesting service information from a server and receiving service information, a post playback permission and a post playback instruction from the server. After execution of the content information, sending the post execution instruction to the server and receiving content related to the post execution instruction from the server. The post execution instruction is executed and the content related to the post execution instruction is available for execution.

Yet another embodiment of the present invention is directed to the method implemented using an IPTV device that also includes determining, after executing content information, whether the asset information comprises one or more post execution instructions.

Yet another embodiment of the present invention is directed to the method implemented using an IPTV device in which the post execution instructions instruct an IPTV device to: request an asset list from a server; receive the asset list from the server; and display asset list on the IPTV device.

Yet another embodiment of the present invention is directed to the method implemented using an IPTV device in which the post execution instructions instruct an IPTV device to: request asset information; receive the asset information; and display the asset information.

Yet another embodiment of the present invention is directed to the method implemented using an IPTV device in which the post execution instructions instruct an IPTV device to: request an asset list or asset information; receive a form; and display the form.

Yet another embodiment of the present invention is directed to a method of executing playback of content that includes transmitting authentication information to a server, from a secondary device and receiving a list of available IPTV devices, at the secondary device, from the server. Identification of a selected IPTV device is transmitted from the secondary device and a content list associated with the selected IPTV device is received at the secondary device. Next the content list may be browsed and content for playback may be selected. The server transmits to the selected IPTV device: the selected content; and post execution instructions. The post execution instructions determine post content playback functionality of the selected IPTV device.

Yet another embodiment of the present invention is directed to a method of executing playback of content, described above, wherein the post execution instructions instruct the selected IPTV device to: request an asset list from a server; receive the asset list from the server; and display asset list on the selected IPTV device.

Yet another embodiment of the present invention is directed to a method of executing playback of content, described above, wherein the post execution instructions instruct the selected IPTV device to: request asset information; receive the asset information; and display the asset information on the selected IPTV device.

Yet another embodiment of the present invention is directed to a method of executing playback of content, described above, wherein the post execution instructions instruct the selected IPTV device to: request an asset list or asset information; receive a form, such that the selected IPTV device displays the form.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIGS. 5A-5D show examples of redirecting an IPTV device according to embodiments of the present invention.

FIG. 7 shows an example of a state diagram according to an embodiment of the present invention.

DETAILED DESCRIPTION

Figure 1:
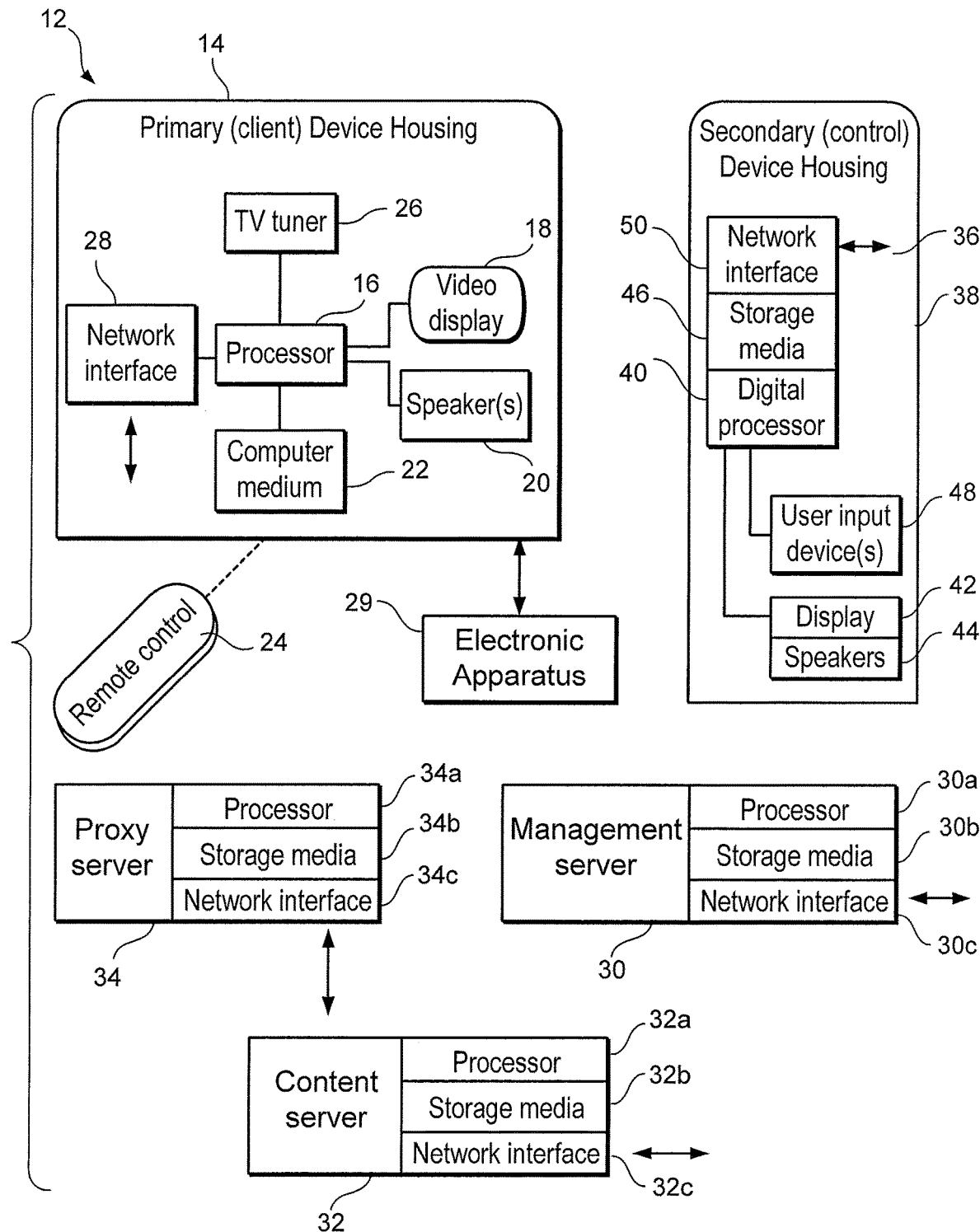
FIG. 1 shows a block diagram of one embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing facilities, or processing modules. The processing devices, processing facilities, or modules, may be coupled such that portions of the processing and/or data manipulation may be performed at one or more processing devices, facilities or modules, and shared or transmitted between a plurality of processing devices, facilities or modules.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user browsing content on a second device to have their selection played by a first device. The user can then continue to browse the content on any number of second devices without interrupting the content that is playing on the first device.

The first device may be an IPTV. The second device may be another electronic device. The method include an architecture design and implementation that allows a user to navigate, browse, and search content on a second device that may be a consumer electronic device such as a Sony Ericsson® smart phone, VAIO® PC, VAIO® laptop, MYLO®, personal computer, or other apparatus with sufficient processing and storage capability, or any device with a web browser. Concurrently, while a user is using the first device, another user can perform these activities on the second device and send a media selection to the first device of the user's choice for playback A second device may act as a visual aid to the IPTV, but does not require additional investments by the user because it makes use of a device (such as a cellphone, laptop, etc) which most users would typically already have in their possession. The second device executes a program that allows the second device to act as the visual aid. It is a low cost solution which opens up a huge window of business and technical opportunities. It is a favorable complement to the IPTV because the device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in HTML, which can be loaded by any device with a browser, hence not limited to only a small set of compatible devices.

An IPTV system typically includes an IPTV device and including an IPTV client processor controlling a video display to present content thereon. The system also includes a second device including a control processor and a management server communicating with the IPTV client over the Internet. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token that may subsequently be presented by the IPTV client to a content server to obtain content from the content server. The management server receives and stores a local IP address of the IPTV client. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include, for example, that the IPTV client requests the management server to provide information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of a content so that unauthorized distributions of content are effectively prevented.

According to an embodiment of the present invention, a consumer electronics device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have one or both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics device has a unique identifier that, without other means, is able to identify the client consumer electronics device within the IPTV system. The unique identifier may be assigned by a manufacturer or assigned by the management server when the client consumer electronics device is registered in the IPTV system.

To undertake present principles, the processor 16 may access one or more computer readable storage media 22 such as but not limited to RAM-based storage (e.g., a chip implementing dynamic random access memory (DRAM) or flash memory or diskbased-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals. The electronic device may be a digital video recorder, a Blu-ray® player, a game player, an audio amplifier, or an air conditioner.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2A:
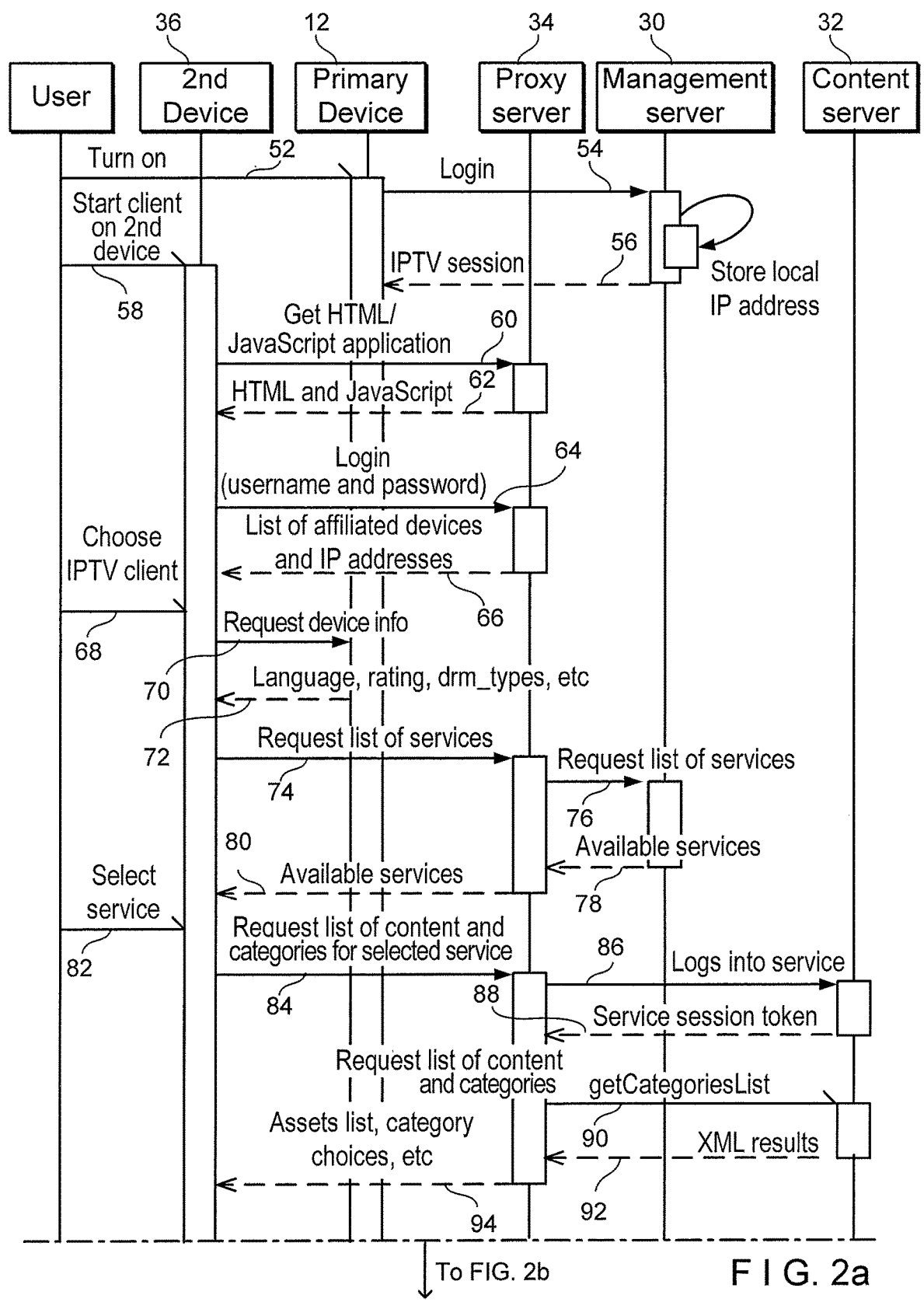
FIGS. 2A and 2B show a series of steps according to an embodiment of the present invention.
Figure 2B:
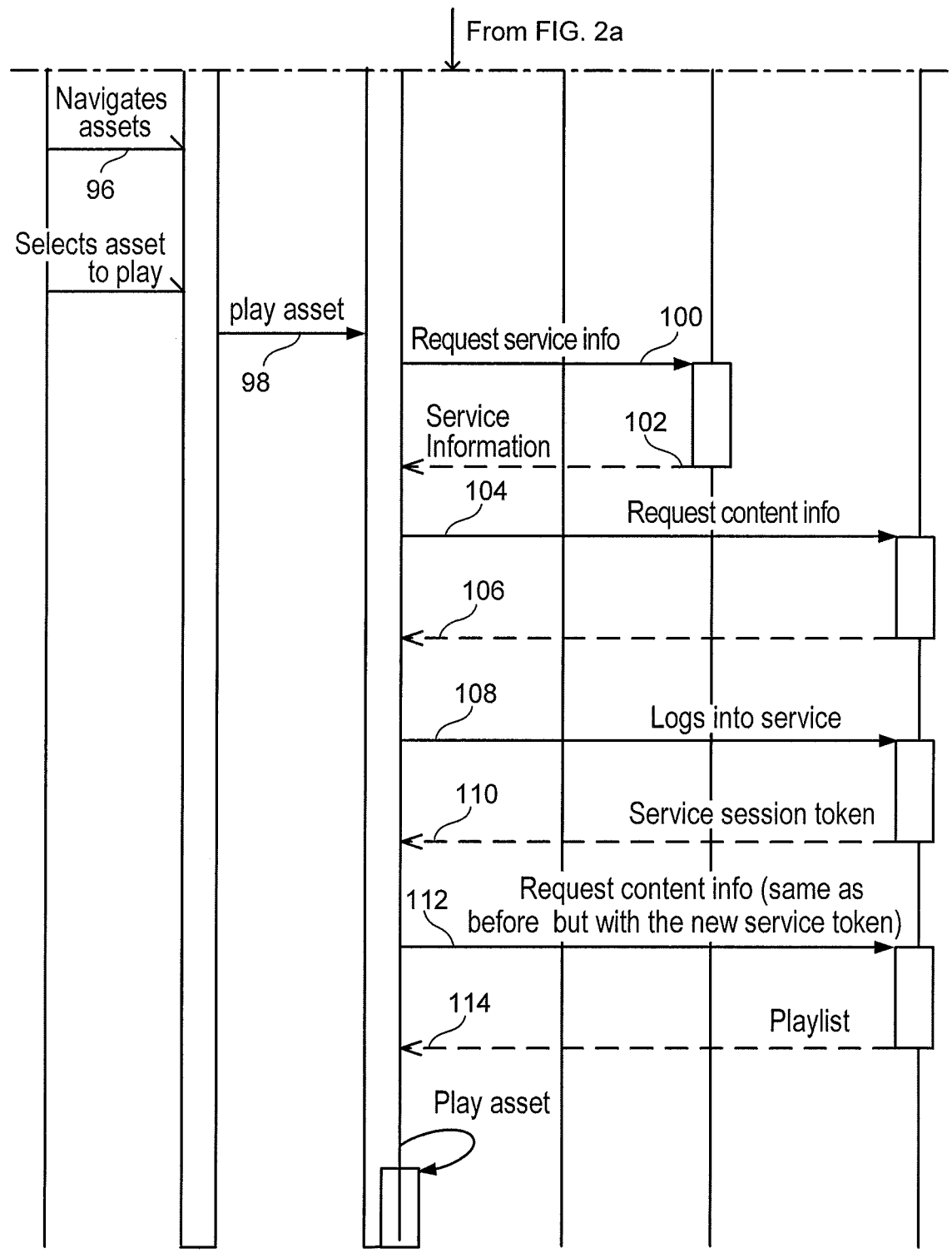

FIGS. 2A and 2B (generally FIG. 2) show an example embodiment of present principles for enabling a user to use a second device 36 to browse assets and select one to have a first device 12 such as a main IPTV client play the content. FIG. 2 assumes that the user has already created an account with the management server 30 and has affiliated the main IPTV device with that account. In general, a user loads the second application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for playback in the form of a reference id which is used by the IPTV to retrieve playback information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local IP address of the IPTV client device 12. Alternatively, in another embodiment, the management server 30 does not return a token in response to receiving login information. Subsequently, no token is required to be presented by the IPTV client device to the participating content server 32 to obtain content.

At state 58, the user instantiates an IPTV client control utility on the second device 36. The utility executed on the second device 36, at state 60, sends a request to the proxy server 34, which returns (62) a response in a suitable language, such as hypertext markup language (HTML) with JavaScript® for the second device 36 to execute in accordance with description below. This JavaScript® makes asynchronous JavaScript® and extended markup language (XML) (AJAX) calls to the proxy server and to the IPTV client device to obtain information to control the IPTV client device. In another embodiment, step 60 may not be necessary where other client application implementations are used, such as one where the client application is not downloaded each time it is used. It should also be noted that other technologies (e.g. C, C++, Perl®, and Flash®) can be used for the implementation of the client application and that neither HTML nor JavaScript® are required.

With more specificity, at state 64 using the JavaScript®, or alternatively, another method of implementing the client application, received from the proxy server 34 the second device 36 prompts the user to input to the second device 36 the user account information, such as account login information, including, e.g., the same user name and password that the IPTV client provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account associated with the user name and password, including their local IP addresses which were stored by the management server 30 after login at 54 (and subsequently provided to the proxy server 34).

When the user inputs to the second device 36 at state 68 a selected IPTV client device (in this example, the IPTV client device 12) to use with the second device, the second device 36, using the local IP address returned at state 66, accesses the IPTV client device 12 directly. The second device 36 requests information about the IPTV client device 12 at state 70, including language information, rating information, digital rights management (DRM) information, etc. as desired, which information is returned from the IPTV client device 12 to the second device 36 at state 72. Since the second device 36 knows the IP address of the IPTV client device 12 and consequently communicates directly with the IPTV client device 12, the second device 36 communicates using a local web address of the IPTV client device 12 that need not be globally addressable, and may so communicate as long as the second device 36 and IPTV client device 12 are on the same local network.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the available services at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service of the content server 32 providing the selected service. At state 88 the content server 32 provides to the proxy server 34 a service session token for the particular content server 34. State 90 indicates that if desired the proxy server 34 may also request a list of content and categories of the content server 32, and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client device 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony Infrared Remote Control System (SIRCS) protocol. The second device may transmit command signals to the IPTV client to control the electronic device 29.

As shown in FIG. 2, if desired, temporally between states 102 and 116 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client device at state 110 along with the before-mentioned asset information. Also, a request of content information may be made (112) and a playlist returned to (114) the IPTV client device 12.

The software (e.g., JavaScript®/HTML) that is downloaded at state 62 can be made available to all electronic vendors who wish their users to be able to navigate, browse, and search IPTV content on a second device. In an embodiment in which HTML is used, the software can be used on any client device with a web browser.

The following situations illustrate some scenarios where the second device complements the IPTV's shortcomings, hence providing better user experience for the IPTV user. For example, a group of friends is watching video clips on an IPTV. Each of them are browsing content on their own Second Display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a Second Display to select a movie for them to watch when the game ends. In another example, a user may be away from an IPTV, but the user may use a smart phone as the second device to browse contents and select a preferable content to be played on the IPTV.

In the above-identified situations, using a second device can provide many benefits, such as:

Browsing in own language without disturbing the big screen

Ease of data entry in a language not supported by the IPTV

On-device service affiliation for premium services like Netflix

Cross-device playback and resume from a recently viewed list

Social sharing of content to enhance content proliferation

Management of subscription-based services from a single location

Browsing and queue management when away from the IPTV device or when not in proximity to the IPTV device One-click Customer service without the need of entering personal or device information Quick access to relevant device specifications and manuals Hyper-linked text in forms directs users to informational sites Content Queue across devices Advertisement revenue through Second display usage The second device provides an enhanced user experience of the IPTV without adding to the hardware costs of the unit, thus making data entry easy and allows users to browse content on the side. IPTV is also a global solution which connects various IPTV devices together in a cohesive manner through its potential of initiating playback across devices. The system also provides the highest level of customer service to users through its one-click customer service feature, where users do not provide any device information, which can be difficult to retrieve in the event of a device breakdown.

Figure 3:
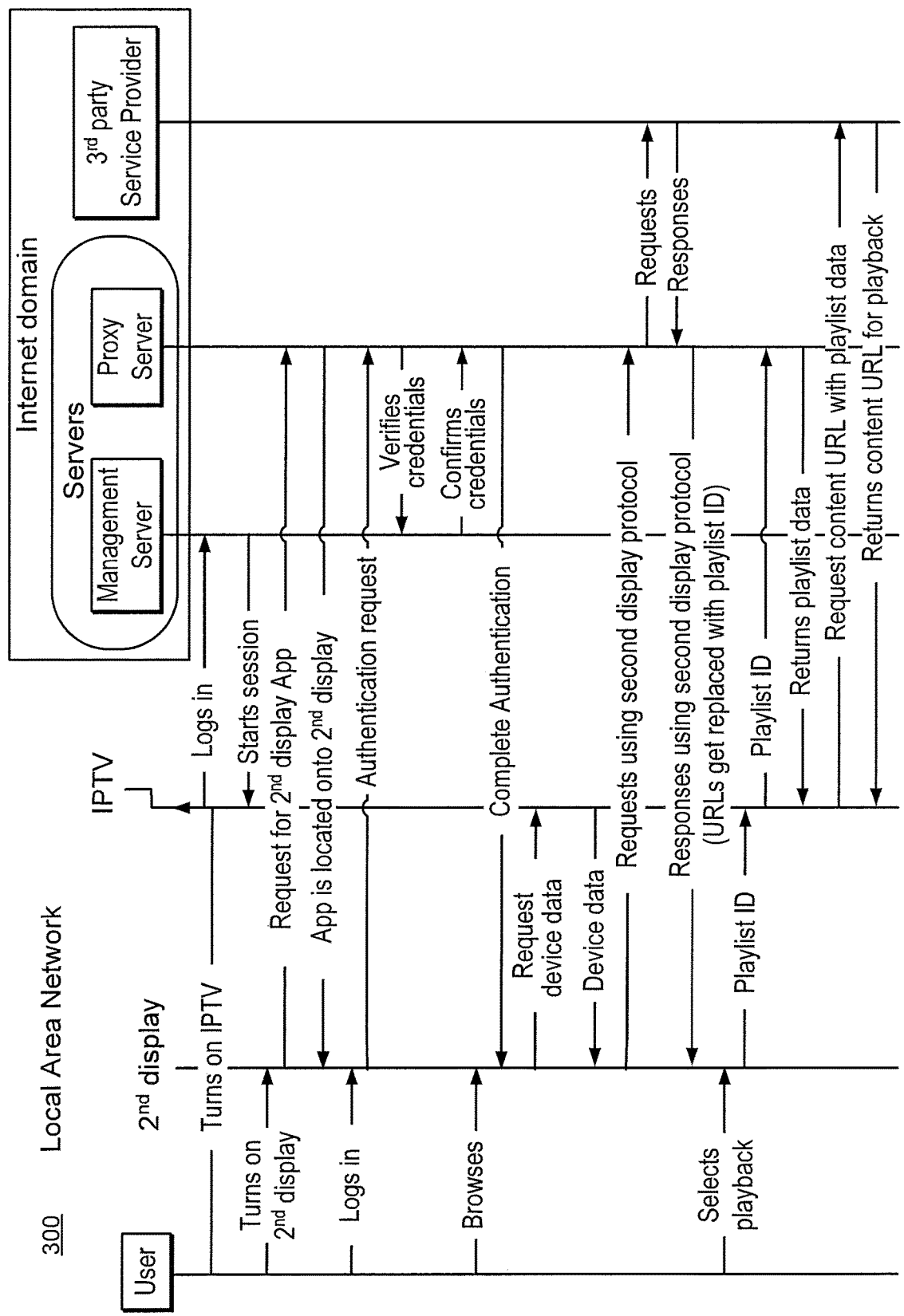
FIG. 3 shows a schematic representation of an embodiment of the present invention.

FIG. 3 shows a schematic representation 300 of an embodiment in which the present invention finds ready application. First a user turns on an IPTV client. The IPTV logs into a management server so that the management server knows which IPTV device is in communication. The user does not have to interact or provide any information as part of this device interaction. The management server starts the session. Then the user turns on the second display. In an embodiment in which the second display does not have the second display application, the second display requests the second display application (app) from the proxy server and the second display application is loaded onto the second display. In another embodiment, the second display application is installed on the second display. Then the user logs into the user account. An authentication request is sent from the second display to the proxy server. The proxy server verifies credentials with the management server, and then the management server confirms credentials with the proxy server. So that authentication is completed.

Then the user browses an Internet video link. After that, the device data is requested from the second display and then the requested device data is sent from the proxy server to the second display device. Thus, the second display device can be used to display content even when the IPTV device is not available. The use of the second display device to display content depends on the display capabilities and display functions of the second display device. The second display sends a request using second display protocol to the proxy server, and then the proxy server requests to the service provider, and the service provider responds. The proxy server responds using a second display protocol to the second display with the associated URL replaced with playlist ID.

After the user selects playback, the second display device attempts to send the playlist ID to the IPTV client device. When the IPTV client device is reachable, the playlist ID is received. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client device. When the IPTV client device is not reachable, the playlist ID is not received and the second display device notifies the user that the IPTV client device is not reachable. The second display device stores the Playlist ID for a later attempt at sending to the IPTV client device.

In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
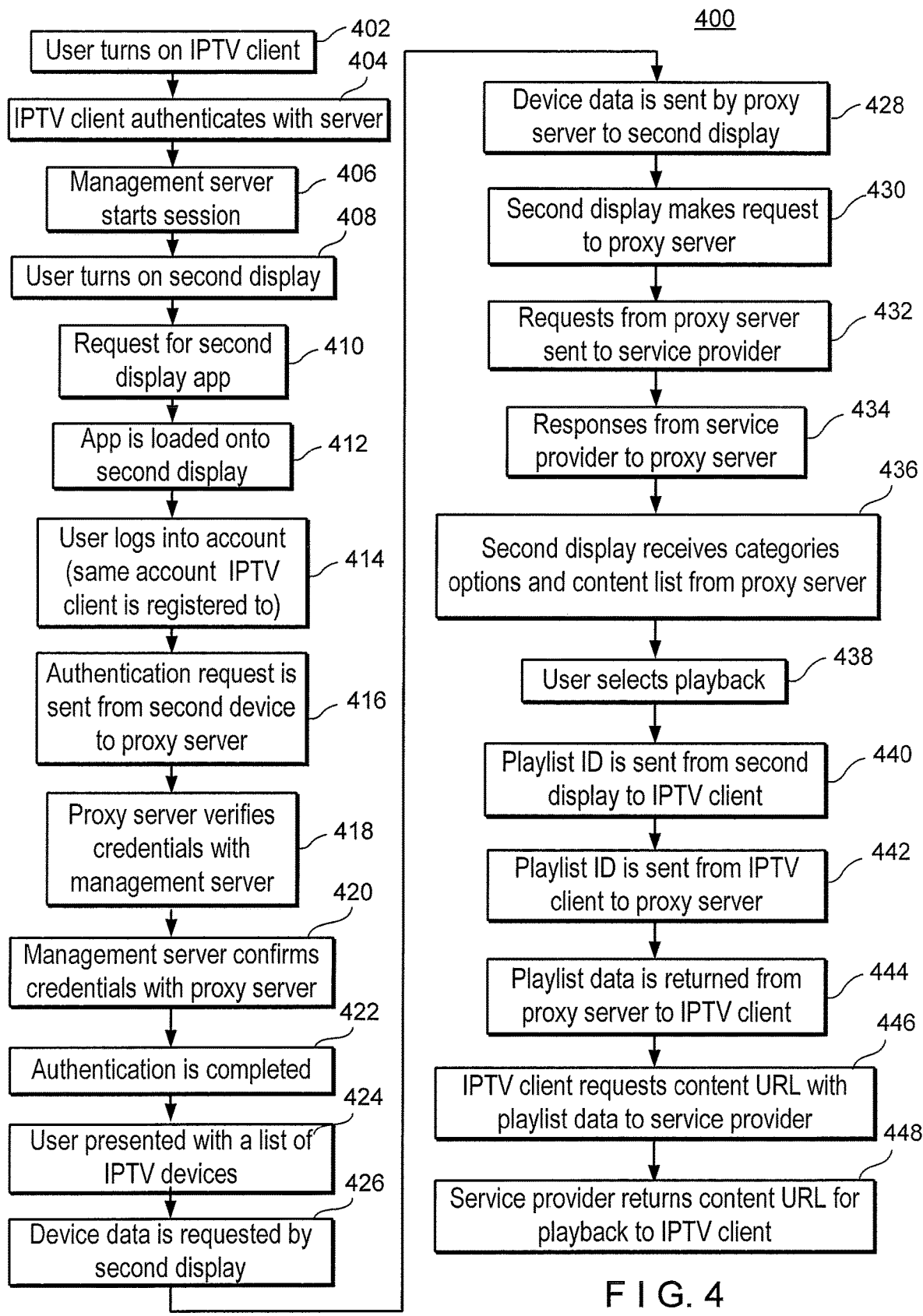
FIG. 4 shows a flow chart of processing steps according to an embodiment of the present invention.

FIG. 4 shows a flow chart 400 of processing steps according to the embodiment of FIG. 3.

The process begins in step 402 in which the user turns on an IPTV client device. After the IPTV client device is registered with the management server, or authenticated with the management server, as shown in step 404, the management server starts the session in step 406. Then in step 408 the user turns on the second display, and, when necessary, sends a request for a second display application to a proxy server, as shown in step 410. The request for the second display application is optional and is used only when desired. When requested, the application is loaded onto the second display in step 412. In step 414 the user logs into the account, which is the account the IPTV device is registered. In step 416 an authentication request is sent from the second display to the proxy server. In step 418 the proxy server verifies the credentials of the IPTV client with the management server, and then in step 420 the management server confirms the credentials with the proxy server. In step 422, authentication is completed. It is an embodiment of the present invention that the server in steps 418 and 420 may be in the same server. Alternatively, there may be more than two servers splitting the server tasks.

In step 424 the user browses the Internet video link and is presented with a list of IPTV devices. In step 426 device data, describing the second display is requested by the second display device and then in step 428 the requested device data is sent by the proxy server to the second display device. In step 430 the second display sends a request using a second display protocol to the proxy server. In step 432 requests from the proxy server are sent to the service provider and the service provider responds, as shown in step 434. In step 436, the second display device receives categories, options and a content list from the proxy server. Alternatively, the proxy server may send content to the second display device with the associated URL replaced with playlist ID. Alternatively, the service provider may permit, in some cases, the URL is sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects playback and then in step 440 the playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to the proxy server, and playlist data is returned from the proxy server to IPTV client in step 444. In step 446 the IPTV client requests content at the URL associated with playlist data to the service provider, and then in step 448 the service provider returns content at that URL for playback to the IPTV client device. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

The present invention relates to redirecting an IPTV device after content playback. The redirect can be specified by a service provider, an advertising server, or a user's input.

The present invention is useful to service providers because control is provided to them to redirect a user to a new website or page after a user has viewed provided content. One embodiment of the present invention is providing promotional material, additional information, recommended content, product offerings, merchandise sales and other material and/or articles available for sale.

For example, after a user has watched a Spiderman trailer, the user can be redirected to a promotional form where the user can subscribe for movie updates, special showings, opportunities to meet the actors based on locations, buy movie tickets, or buy related merchandise. Alternatively, the user may be redirected to related movies or movie trailers.

Embodiments of the present invention allow a service provider to specify what data will be displayed on an IPTV device and/or other functions that may be performed by the IPTV device once the IPTV device is finished playing content. The service provider accomplishes this "re-direct" function by returning XML tags that contain directional command, or instruction, for an IPTV device to take after an initial or requested asset is played when the IPTV device requests an asset list or asset information in the commands to access data and/or content. An XML tag may direct an IPTV device to a website or related content, or direct the IPTV device to play a related asset. The XML tag directs the IPTV device to go to a particular category or asset. The XML tag also has data regarding the asset to request. The XML tag is typically defined as part of the API (application programming interface) and provides instruction on the next action after an asset is transmitted from the service provider.

FIGS. 5A-5D (generally FIG. 5) show a schematic representation according to a redirect function of an embodiment of the present invention.

As shown in FIG. 5A, which shows a case where no exit or redirect action is specified, a user 502, access an IPTV device 504 to communicate with a service server, or module 506, which provides data such as assets lists and asset information. An assets list may include, for example, assets and/or links to other categories. As shown in FIG. 5A, the IPTV device 504 sends a command to obtain an assets list (step 508) from service module 506. The service module 506 transmits an assets list (step 510) to the IPTV device 504, which then displays the assets list (step 512). The user 502 may then select an asset to play (step 507) from the assets list. The IPTV device 504 sends a command to service module 506 to obtain asset information (step 514), which is used by the IPTV device to play an asset.

The service module 506 sends the asset information to the IPTV device 504 (step 516). The IPTV device 504 then plays the asset (step 520). Following the playing step, the IPTV device 504 displays the assets list (step 522). The assets list displayed in step 522, as shown by element 526, is the same assets list that the played asset (step 520) was chosen from.

FIG. 5B shows an embodiment in which a new assets list is displayed upon exit. As shown in FIG. 5B, a user 502, access an IPTV device 504 to communicate with a service module 506, which provides data such as assets lists and asset information. As shown in FIG. 5B, the IPTV device 504 sends a command to obtain an assets list (step 508) from service module 506. The service module 506 transmits an assets list (step 510) to IPTV device 504, which displays the assets list (step 512). The user 502 may then select an asset to play (step 507) from the assets list. The IPTV device 504 sends a command to service module 506 to obtain asset information (step 514).

The service module 506 sends the asset information to the IPTV device 504 (step 516). The IPTV device 504 then plays the asset (step 520). Following the playing step, the IPTV device 504 sends a command to the service module 504 to obtain an assets list (step 530). The service module 506 sends the requested assets list to the IPTV device 504 (step 532). This assets list sent in step 532 is a different assets list than the assets list sent in step 510. When the service module 506 sends the assets list, an XML tag can be sent that contains direction for the IPTV device 504 to direct the IPTV device 504 to a particular website or related content, or the XML tag may direct the IPTV device 504 to play a related asset.

The IPTV device 504 displays the assets list (step 534).

Figure 5C:
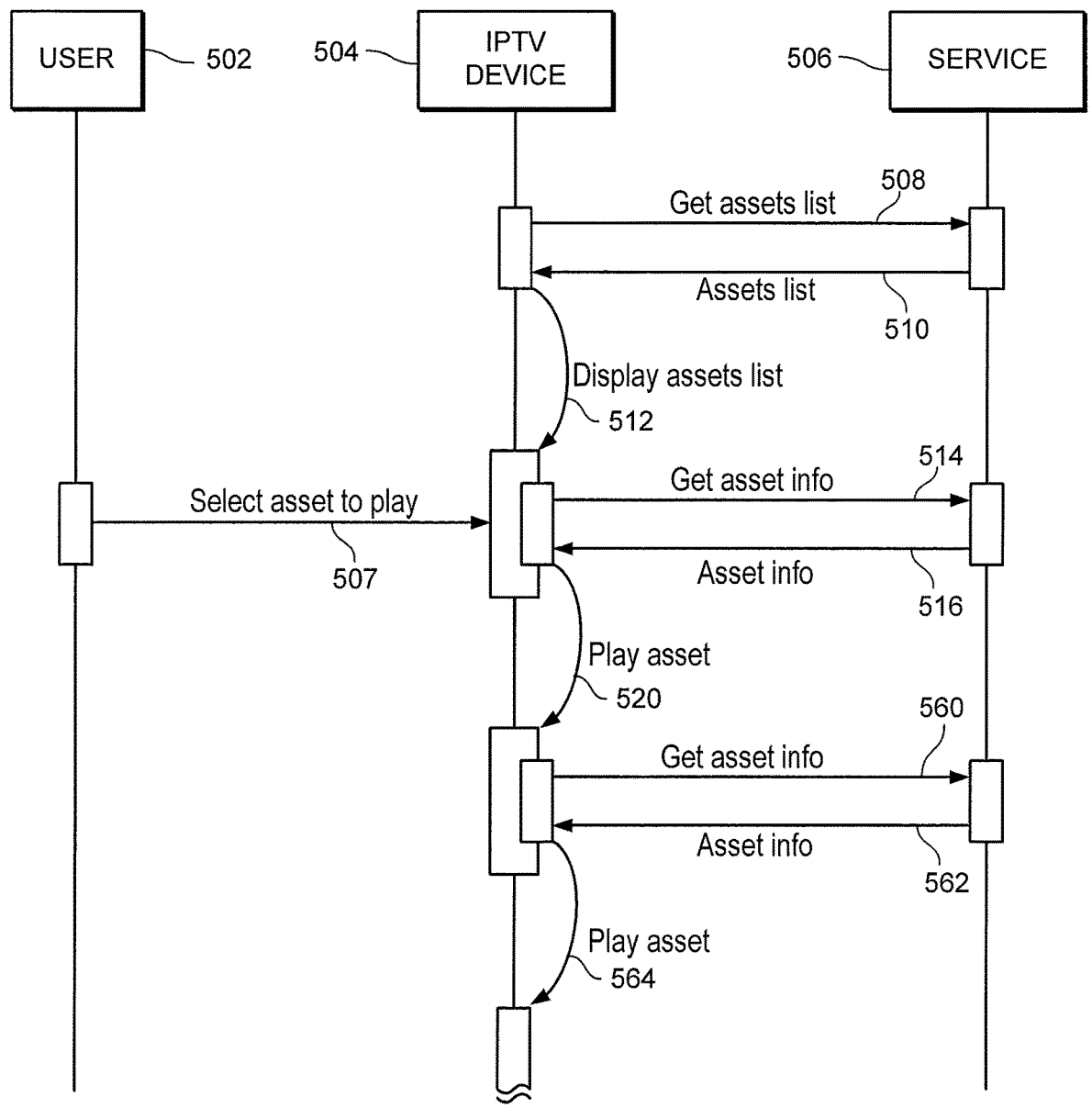

FIG. 5C shows an embodiment in which a new asset is displayed upon exit. As shown in FIG. 5C, a user 502, access an IPTV device 504 to communicate with a service module 506, which provides data such as assets lists and asset information. As shown in FIG. 5C, the IPTV device 504 sends a command to obtain an assets list (step 508) from service module 506. The service module 506 transmits an assets list (step 510) to IPTV device 504, which displays the assets list (step 512). The user 502 may then select an asset to play (step 507) from the assets list. The IPTV device 504 sends a command to service module 506 to obtain asset information (step 514).

The service module 506 sends the asset information to the IPTV device 504 (step 516). The IPTV device 504 then plays the asset (step 520). Following the playing step, the IPTV device 504 sends a command to the service module 504 to obtain assets information (step 560). The service module 506 sends the requested asset information to the IPTV device 504 (step 562). When the service module 506 sends the assets information, an XML tag can be sent that contains direction, or instruction, for the IPTV device 504 to retrieve a category or asset from the service module. This asset is then displayed on the IPTV device 504, as shown in step 564.

The operation represented in FIG. 5C differs from that in FIG. 5B, in that assets, which are identified by the service module, are requested and played (560, 562, 564) by the IPTV device in FIG. 5C, whereas asset lists are requested and displayed (530, 532, 534) in FIG. 5B.

FIG. 5D shows an embodiment in which a form is displayed upon exit from playing the asset. As shown in FIG. 5D, a user 502, access an IPTV device 504 to communicate with a service module 506, which provides data such as assets lists and asset information. As shown in FIG. 5D, the IPTV device 504 sends a command to obtain an assets list (step 508) from service module 506. The service module 506 transmits an assets list (step 510) to IPTV device 504, which displays the assets list (step 512). The user 502 may then select an asset to play (step 507) from the assets list. The IPTV device 504 sends a command to service module 506 to obtain asset information (step 514).

The service module 506 sends the asset information to the IPTV device 504 (step 516). The IPTV device 504 then plays the asset (step 520). Following the playing step, the IPTV device 504 sends a command to the service module 506 to obtain an assets list (as in FIG. 5B) or obtain asset information (as in FIG. 5C) (step 550). In response to this request from the IPTV device 504, the service module 506 sends a form to the IPTV device 504 (step 552). The IPTV device 504 displays the form (step 554), which the user 502 can fill in.

Figure 6:
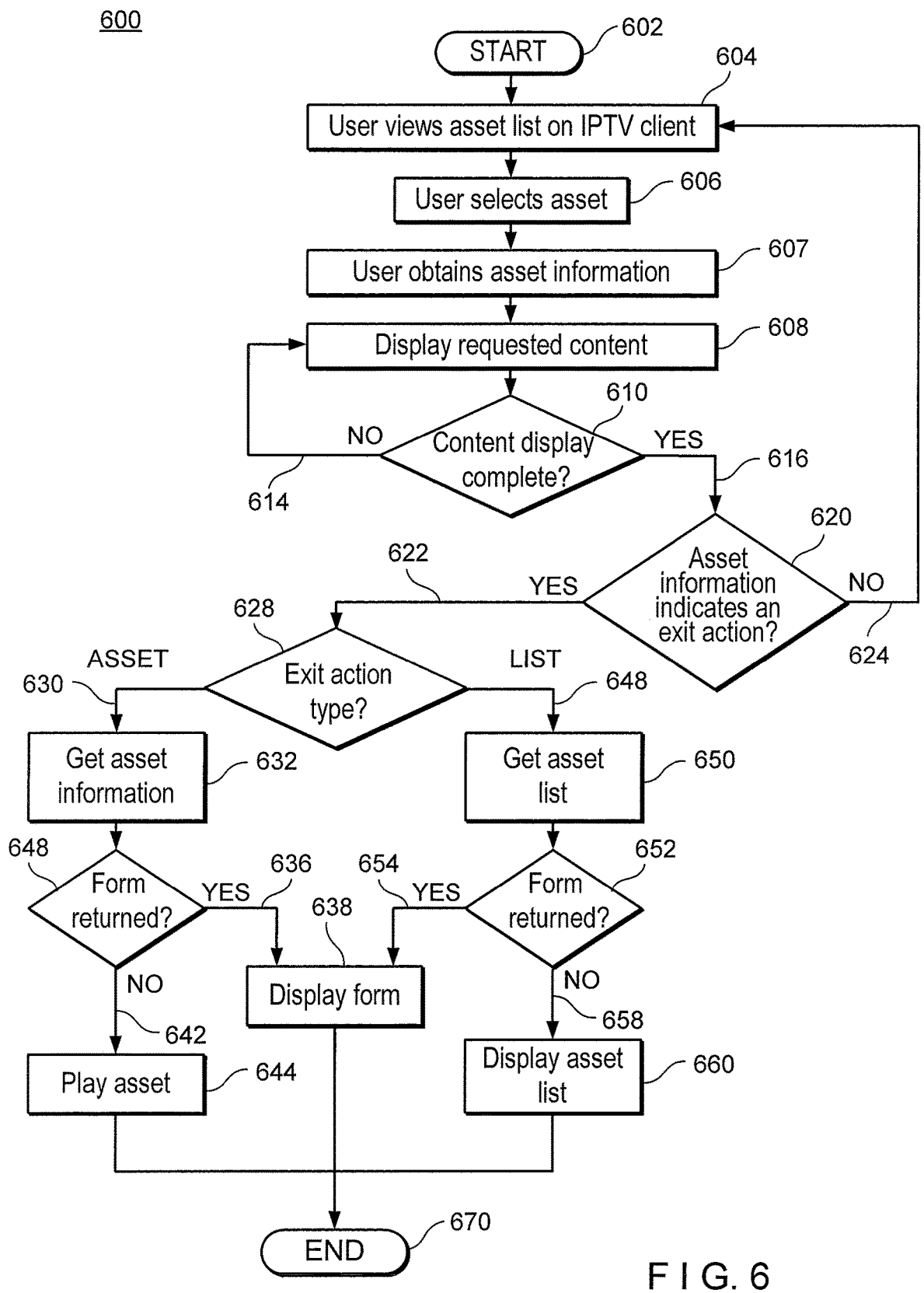
FIG. 6 shows an example of a series of steps of redirect according to an embodiment of the present invention.

FIG. 6 shows a series of steps 600 according to a redirect function of an embodiment of the present invention.

As shown in FIG. 6, the process starts, as shown in step 602. A user views an assets list provided by a service, using an IPTV device, as shown in step 604. The user may then select an asset from the assets list, as shown in step 606. This selection is transmitted to the service provider using the IPTV device. The user obtains asset information, as shown in step 607. The service provider returns content of the selected asset, and the IPTV device displays the requested content, as shown in step 608.

A determination is made at step 610 whether the content displaying function is complete. If the content display is not complete, "no" line 614 leads to the display step, 608.

If the content display is complete, "yes" line 616 shows that a determination is made at step 620 whether the asset information indicates an exit action, as may be present in the API. If not "no" line 624 shows that the asset list is displayed as shown in step 604. The exit action typically directs the IPTV device to return to the previous location to which the IPTV device had navigated, which may be, for example, a list of assets.

If an exit action is indicated in step 620, "yes" line 622 shows that the type of exit action is determined, as shown in step 628. If an asset is desired, asset line 630 shows that asset information is obtained, as shown in step 632. An XML tag can be sent that provides direction for an IPTV device, as mentioned above. A determination is made whether the asset information is a form that is returned, as shown in step 648. If so, "yes" line 636 shows that the form is displayed, as shown in step 638. If a form is not returned, "no" line 642 shows the asset is played, as shown in step 644.

If step 628 determines that an asset list is appropriate, "list" line 648 shows that an asset list is obtained, as shown in step 650. An XML tag can be sent that provides direction for the IPTV device to navigate to a particular site that is a source for the asset list. A determination is made whether the form is returned, as shown in step 652. If so, "yes" line 654 shows that the form is displayed, as shown in step 638. Returning the form to the user is accomplished by the API allowing the form to be included in the results. The form is displayed to the user instead of processing the information for an asset. If the form is not returned, "no" line 658 shows that an asset list is displayed, as shown in step 660.

Following playing of the asset (644), displaying a form (638) or displaying an asset list (660), end step 670 is reached.

FIG. 7 shows an example of a state diagram 700 according to an embodiment of the present invention. As shown in FIG. 7, a secondary display device, or second display, 702 requests authentication by a server device 706 (712). Once the secondary device 702 has been authenticated, the server device 706 provides available devices (714), such as IPTV devices, to the secondary device 702. A user, operating a secondary device 702, selects an available, or reachable, IPTV device 704, (716) to display data, such as content list, content, asset, asset list, and other information. The selected IPTV device may be a default IPTV device, or a previously selected IPTV device, or other IPTV device that is reachable. State 718 shows that the second display device 702 is used to request a content list from the server 706. The server 706 provides a content list (720) to the second display device 702. A user may then use the second display device to browse a network, such as the Internet (722). The second display device 702 then requests the IPTV device 704 to play particular content (724). The IPTV device 704 requests information (726) from the server device 706.

The server device 706 provides content information including post playback instructions (728) to the IPTV device 704. The IPTV device 704 requests content (media) (730) from a service provider 708. The service provider 708 provides the content (732) to the IPTV device 704, which the IPTV device 704 plays (734). The IPTV device 704 then executes post-playback instructions (736). These post playback instructions are, for example, an asset list, and/or asset information, and/or a form. Furthermore, the post playback instructions (736) may determine post playback functions of the particular IPTV device 704.

Figure 8:
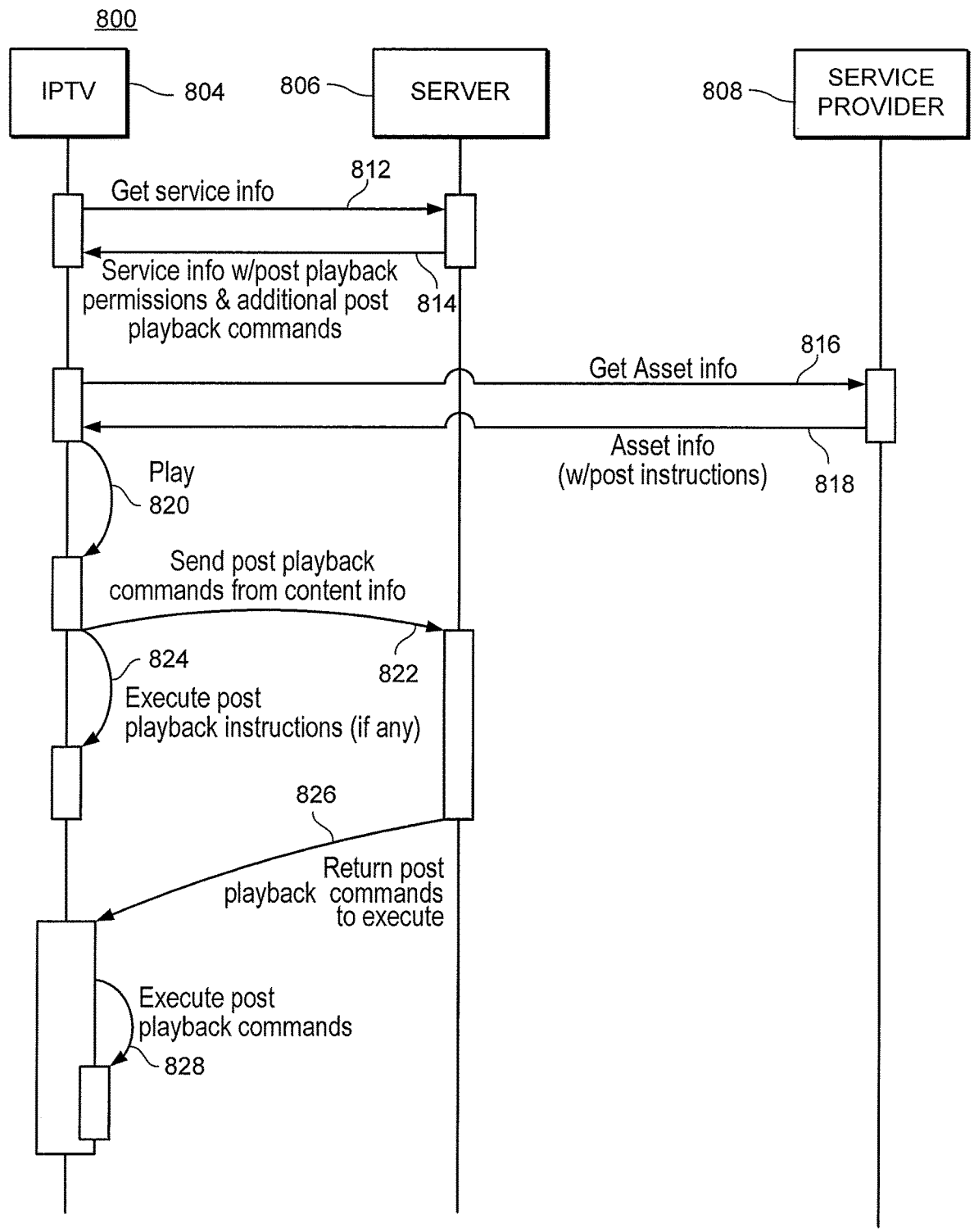
FIG. 8 shows another example of a state diagram according to another embodiment of the present invention.

FIG. 8 shows another example 800 of a state diagram according to another embodiment of the present invention. As shown in FIG. 8, the state diagram 800 is independent of a secondary display device. The IPTV device 804 requests service information (812) from server device 806. The server device 806 provides service information with post playback permissions and additional post playback commands (814) to the IPTV device 804.

The IPTV device 804 requests asset information (816) from a service provider 808. The service provider 808 provides asset information with post playback instructions (818) to the IPTV device 804. The IPTV device 804 plays the asset (820) and then sends post playback commands from the content information (822) to the server 806. The IPTV device 804 executes any and all post playback instructions (824). The server 806 returns post playback commands (826) to IPTV device 804. The IPTV device 804 then executes post playback commands (828).

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A non-transitory computer-readable medium storing a computer program that when executed on a computer performs processing comprising:
    providing an asset list from a provider to a receiving device;
    causing the asset list to be displayed on the receiving device;
    receiving an asset selection to play an asset from the asset list;
    providing content associated with the asset selection to be played on a display device separate from and selected by a user of the receiving device;
    providing post-playback instructions to the display device along with the content;
    after playing the content, operating the display device in accordance with the post-playback instructions, wherein the post-playback instructions include directions for the display device to navigate to a specific website, or directions to cause the display on the display device of another asset;
    wherein when the post-playback instructions cause another asset to be displayed, the processing provides to the display device next content associated with another asset on the asset list; and cause the next content to be played on the display device.

2. The non-transitory computer-readable medium according to claim 1, wherein the asset selection is received from the receiving device.

3. The non-transitory computer-readable medium according to claim 1, wherein the post-playback instructions comprise one or more instructions for the display device to retrieve and play additional content after playing the content associated with the selected asset.

4. A method comprising:
    requesting, at a secondary display device, content from a service provider, the content including post-playback instructions to control further operation of a receiving device separate from the secondary display device;
    receiving an asset list from the service provider at the secondary display device;
    displaying the asset list at the secondary display device;
    selecting an asset from the displayed asset list;
    receiving and playing back at the receiving device content from the service provider associated with the selected asset;
    after playback of the content, operating the receiving device in accordance with the post-playback instructions received at the receiving device, wherein the post-playback instructions include directions for the receiving device to navigate to a specific website, directions to cause the display of another asset or directions to cause the display at the secondary display device of another asset list;
    wherein when the post-playback instructions cause another asset to be displayed, the method further comprises receiving at the receiving device next content associated with another asset on the asset list and cause the next content to be played at the receiving device.

5. The method according to claim 4, wherein the asset selection is received from the secondary display device.

6. The method of claim 4, wherein the post-playback instructions include redisplay of the asset list.

\* \* \* \* \*